United States Patent [19]

Lebourg

[11] 4,041,720
[45] Aug. 16, 1977

[54] METHOD AND APPARATUS FOR INSTALLING A SPOOL BETWEEN TWO MISALIGNED PIPE SECTIONS

[76] Inventor: Maurice P. Lebourg, 3700 Greenway Plaza, No. 428, Houston, Tex. 77027

[21] Appl. No.: 654,411

[22] Filed: Feb. 2, 1976

[51] Int. Cl.² .............................................. F16L 1/00
[52] U.S. Cl. .................................. 61/110; 29/401 R; 138/97; 285/18; 285/27
[58] Field of Search .......................... 61/110, 111, 107; 29/401, 407; 285/18, 24, 27; 138/97, 98

[56] References Cited

U.S. PATENT DOCUMENTS

| | | | |
|---|---|---|---|
| 3,260,539 | 7/1966 | Herron | 285/24 |
| 3,558,161 | 1/1971 | Bormioli | 285/27 |
| 3,603,617 | 9/1971 | Lochridge | 285/24 |
| 3,658,366 | 4/1972 | Welch, Jr. et al. | 285/24 |

Primary Examiner—Jacob Shapiro
Attorney, Agent, or Firm—Arnold, White & Durkee

[57] ABSTRACT

A method of installing a spool between misaligned underwater pipeline sections to effect connection thereof, as in the repair of a pipeline, the hook-up of a riser flow pipe to an underwater pipeline, or the connection of two underwater pipelines, is disclosed. The method is based upon the precise determination of the spatial relation between the pipe ends and the determination of an angle of entry of the spool in a direction to avoid binding between the pipe and spool ends. The method involves placement of guides defining surfaces extending beyond the perimeter of both the pipe and spool ends which define the direction of entry of the spool between the pipe ends and protect the surfaces from damage. The manner of placement of the guide surfaces is determined when the spool is constructed, so that once the spool is lowered underwater, the angle of entry can be readily perceived by aligning the guide surfaces. This minimizes the necessity for orientation of the spool underwater. The guide surfaces may be oriented to permit insertion of the spool at angles as much as 180° apart. Accordingly, an angle of entry which facilitates insertion from a direction generally above the pipeline ends can often be found.

To provide assistance in properly orienting the spool for installation, mechanical guides for attachment to the pipe and spool ends are disclosed. The mechanical guides include mating guide pieces that engage to fix the orientation of the spool with respect to the pipelines and maintain the spool and pipe ends in the proper relationship as the spool is moved into position. Further disclosed is an alignment apparatus for handling the fabricated spool at the installation location and a flange for use on the spool ends.

25 Claims, 13 Drawing Figures

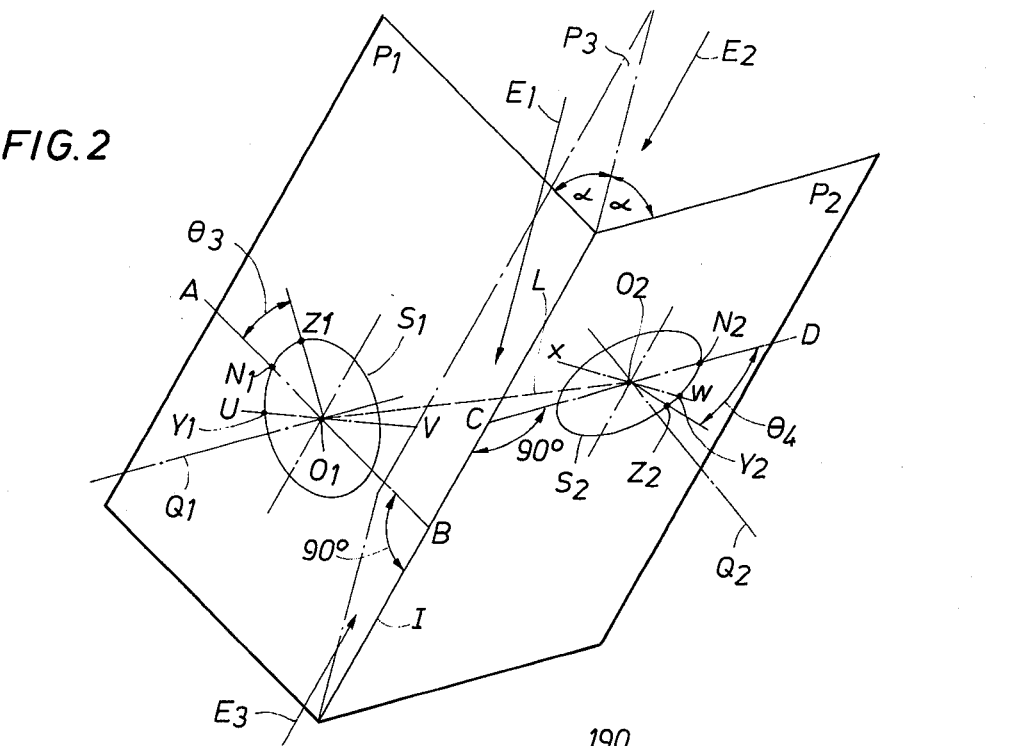
FIG.2
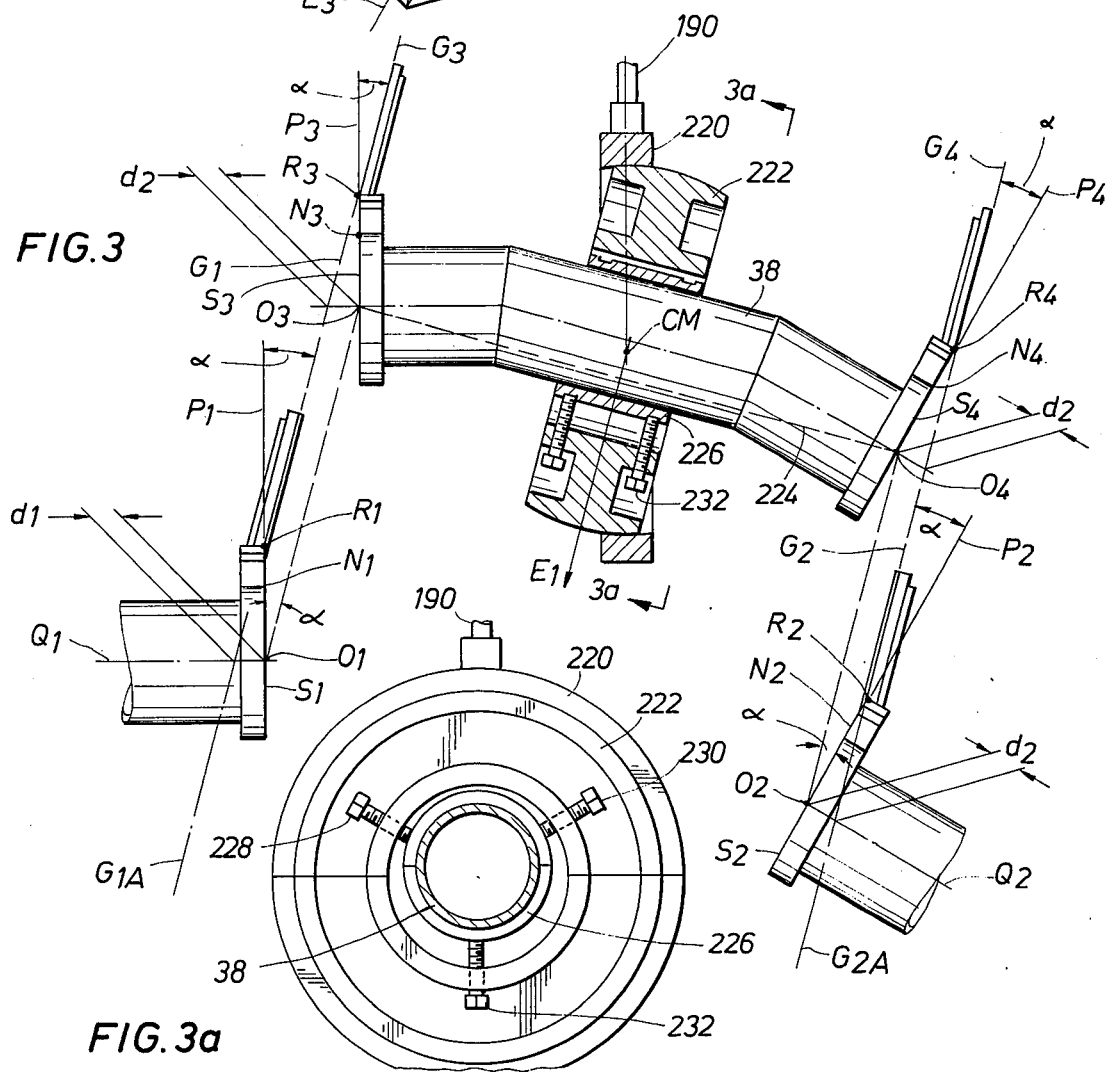
FIG.3
FIG.3a

METHOD AND APPARATUS FOR INSTALLING A SPOOL BETWEEN TWO MISALIGNED PIPE SECTIONS

BACKGROUND OF THE INVENTION

This invention relates generally to techniques for making underwater connection of offshore pipelines, and more particularly relates to the installation of a prefabricated spool into position between two underwater pipelines.

When a pipeline break occurs on an offshore pipeline, the broken section is cut away and a spool piece is fabricated to reconnect the open pipeline ends. Similarly, it is sometimes required that a spool piece be fabricated to connect an underwater pipeline with a riser flow pipe that extends from the ocean floor to the deck of an offshore platform or between two pipe sections laying on the ocean floor.

In the above cases, the pipeline sections will probably not have a coaxial relationship, but will instead have different orientations. Thus, when attempting to fabricate a spool to couple the underwater pipeline sections together, it is necessary to have precise information describing the spatial relation of the ends of the two pipelines. Without an accurately constructed spool, the spool and pipeline end flanges will not properly fit together, requiring that the ends of the pipeline sections be forced into proper alignment or a long bolting technique be used, both of which lead to stress in the pipe sections and in the make-up joints, and also requiring long intervals of diver time to complete the connection.

In making underwater tie-ins in connection with either pipeline joinder or repair or riser flow pipe hookups, it is necessary to proceed through four distinct phases of the overall operation. These phases are: pipeline preparation, determination of pipeline orientation, fabrication of a connecting spool, and installation of the spool.

The phase of pipeline preparation involves preparation of the underwater pipeline ends to be joined. The underwater pipeline ends are cut to define a face perpendicular to the axis of the pipeline so that the exposed ends define a circle. It will be appreciated that if the pipeline ends are cut at an angle to the axis of the pipeline, the exposed end will define an ellipse thereby making spool fabrication very difficult. The pipeline ends are also cut to afford enough space between the ends that the connecting spool will not include any severe bends which could present a significant resistance to flow. Hence, in pipeline joinder operations, the ends to be joined are in planes perpendicular to the pipeline axes. However, most frequently, these planes are at an angle to one another and the axes of the pipeline will not often intersect resulting in the necessity to accurately fabricate a spool in order to effect joinder without undue stressing or manipulation of the pipeline ends.

Determination of the orientation of the pipeline ends becomes the next step in the joinder operation. One prior art technique for making underwater tie-ins is that discussed in the article "Flanged Spool Connects Subsea Pipeline Ends", *THE OIL AND GAS JOURNAL*, Feb. 3, 1974, pages 92, 93 and 96. In that technique, templates or flanges are affixed to each pipeline end and are welded together with rods extending between the pipeline ends. The resulting structure then provides a model or form from which the orientation of the pipeline ends may be determined and from which the spool may be fabricated. Creating the form, however, involves significant diver time. In addition, stresses introduced in the form by welding and raising the form to the surface can produce errors when the spool is fabricated from measurements taken from the form. In addition, there is no accurate technique for inserting the spool between the pipeline ends without excessive diver time.

In copending U.S. application Ser. No. 609,196 entitled "Apparatus for Determining the Spatial Relation Between Two Misaligned Members" filed Sept. 2, 1975 in the name of Maurice P. Lebourg, there is disclosed apparatus for obtaining accurate information concerning the orientation of underwater pipeline ends, and for fabricating a spool for insertion therebetween.

The method and apparatus of this invention is addressed to the final step in the joinder operation, i.e., inserting a spool between the pipeline ends. It may be used to install a spool which has been constructed using spatial orientation information obtained from the welded template technique or using an apparatus of the type disclosed in the above-identified copending application.

SUMMARY OF THE INVENTION

In accordance with this invention, there is provided a novel method for joining pipeline sections, particularly for effecting joinder of pipeline sections under water. The joinder may be effected by moving the spool into engagement with the pipeline ends from a number of angles which range up to 180 degrees apart. Accordingly, regardless of the disposition of the pipeline ends, an angle of approach of the spool to the pipeline ends for ready insertion therebetween will often be found. It will be understood that in some instances when the pipeline ends are both pointed downwardly relative to the subsea surface, it may be necessary to excavate beneath the pipeline ends to be joined in order to insert a spool. Nonetheless, the various angles of approach which may be used make it possible to utilize an angle of entry or insertion which minimizes the amount of excavation which must be undertaken.

In accordance with this invention, there are also provided guide structures which may be used in the method of this invention. These guide structures provide guide surfaces extending beyond the perimeter of both the pipeline and the spool to be inserted. When properly oriented, these guide surfaces may be engaged and thereby permit the spool to be inserted between the pipeline ends with a minimum of possibility of damage to the pipeline ends of flanges occurring.

It is pointed out that the method of this invention may be used to insert a spool having flanges which are to be bolted to corresponding flanges on the pipeline ends. Alternatively, the instant invention may be used to position a spool without a flange for a welded connection between two pipeline sections. In the latter instance, when the spool is to be welded to the pipeline sections, the apparatus of this invention may be employed to position the spool properly between the pipeline ends. A suitable welding clamp, such as is known in the art, would then be affixed to the spool and the pipeline end in order to hold the two members in fixed position in order to accomplish the welding operation.

In a final aspect, the instant invention includes a novel flange structure which includes a movable sealing ring and which may be employed on the spool or on the pipeline ends in accordance with the method of this invention. The novel flange structure permits a spool to be inserted between pipeline ends with a very close tolerance. After the flange is in position, a sealing ring may be moved to seal the junction between the spool and the pipeline end.

Finally, it will be appreciated that the methods and apparatus of the instant invention are singularly adaptable to the joinder of pipeline ends under water. Although it will be understood that the methods of this invention may be used to join pipeline ends in other environments, it is in the insertion of a spool between two ends of an underwater pipeline that problems most often accrue. It is impractical to fabricate the spool section-by-section from one pipeline end to the other. Hence, it is necessary to fabricate a spool on the surface and insert it between the pipeline ends with a minimum of stress being imposed on the pipeline. In surface operations, it is typically satisfactory to fabricate the spool section-by-section from one pipeline end to the other.

In accordance with this invention, there is provided a method for installing a spool which has been fabricated to fit closely between the ends of two pipeline sections. As has been pointed out above, in the preparation phase of any joinder operation, the pipeline section ends should be disposed so that the centers of the pipeline ends to be joined may be connected by an imaginary line segment which does not intersect the wall of either pipeline section. Thus, if this condition does not exist, in the preparation phase of any joinder operation, one pipeline section is preferably cut in order to achieve this condition. It is preferred to make the joinder of the pipeline sections in a fashion so that there are no severe bends in the spool which might impede flow through the pipeline. Accordingly, if two pipeline sections are disposed in a manner as to create a severe angle or bend in the spool, the pipeline sections are preferably cut off. In cases where the pipeline ends to be joined are far apart, an intermediate straight section of pipe might then be inserted between two spools which in turn connect to the free pipeline section ends. By these various techniques, a joinder can be effected without producing severe bends or flow obstacles in the pipeline.

The method of this invention is used to join cylindrical pipelines which have prepared ends which define circles. Thus, each end of the pipeline section lies in a plane perpendicular to the axis of the pipeline itself. It will be understood that the method of this invention may be employed to join pipeline sections of differing diameters by fabricating a spool which will properly mate with a different diameter pipeline section.

It will be understood that if two pipeline sections lie on the ocean bottoms with the planes of the ends of the pipeline parallel, a spool may be inserted between those pipeline sections from any angle above the pipeline. In such an instance, the apparatus of the instant invention could be used. However, it is in the instance where the planes of the ends of the pipeline sections to be joined lie in intersecting planes that the method of this invention becomes most important. Under those circumstances, it is difficult to ascertain the proper angle of entry in order to insert the spool between the pipeline sections. In accordance with the methods of this invention, guides can be readily oriented on both the spool and the pipeline sections defining the direction from which insertion of the spool may be accomplished and furthermore, guiding the spool into position with minimum damage to the ends of the pipeline sections or the ends of the spool.

Accordingly, the methods of this invention involve orienting a spool to be inserted between two pipeline sections such that the corresponding points on the mating spool and pipe ends define parallel lines, and such that an imaginary line segment may be extended from the center of each pipeline section end to the center of the corresponding spool end to which it is to be joined without intersecting the wall of the pipelines or the spool. Thus, the spool may be oriented at any position around a 180° arc for insertion between the pipe section ends.

Guides are then affixed to the pipeline ends and to the spool ends, which guides define planes parallel to the line of intersection between the planes of the pipeline ends (and the planes of the spool ends which are oriented identically) and to the line segments between the centers of the pipeline end and the corresponding end of the spool. The guides are arranged to extend beyond the perimeter of the pipeline ends and the spool ends in order that the guides will engage each other before the mating spool and pipeline ends have an opportunity to come in contact. The guides on the pipeline ends are then engaged with the guides on the corresponding ends of the spool and the spool is moved into position with the guides in engagement along a line parallel to the plane of the guides. By this last statement, it is meant that as the spool is moved into position between the pipeline ends, all points on the spool define lines which are parallel to the planes of the guides.

In particular, there are two positions for orienting the guides on the pipeline section ends and on the ends of the spool in order to insert the spool in accordance with the method of this invention. The position of the guides will be chosen depending upon the ease with which insertion may be accomplished from various angles from above the pipeline ends or from the side (generally parallel to the subsea floor) with a minimum of excavation from below the pipeline ends.

In one embodiment effecting the method of the invention, herein called the "parallel insertion technique", the spool is inserted between the pipeline ends in either of two opposing directions along a line parallel to the line of intersection of the planes of the pipeline ends. In this condition, the guides are arranged to extend beyond the pipeline on planes parallel to the pipeline faces and the spool faces, and in a direction parallel to the line of intersection between the planes. When the spool is oriented relative to the pipeline, an imaginary line segment from the center of each pipeline end to the center of the mating spool end will exist substantially within the plane of the face of the pipeline (but not intersecting the wall of the pipeline or the spool). The guides are then engaged and the spool is moved into place with both spool ends moving generally parallel to the pipeline ends until the spool is in position and joinder may be accomplished.

In accordance with an alternative embodiment of the method, the spool is introduced between the pipeline ends in a direction which is not parallel to the line of intersection formed by the intersection of the planes of the pipeline ends. By introducing the spool from a direction perpendicular to the line of intersection between the planes of the pipeline faces, an angle of insertion 90° from the direction of insertion using the parallel technique is achieved. This method is referred to herein as the "wedge technique" since most frequently when using this method, the pipeline ends and spool ends engage simultaneously as the spool approaches the pipeline ends from a general direction within the angle defined by the planes of the faces. Use of the term wedge technique is not intended to infer that there is deleterious wedging or binding when this method is used; the term is used because in this method, movement of the spool relative to the pipeline faces might appear to correspond to a wedge being positioned.

The wedge technique utilizes guides extending beyond the perimeter of the pipeline sections and spool, all of which are parallel, as the spool is positioned. The guides are arranged not typically parallel to the faces of the pipeline section end faces or the ends of the spools, but at an angle thereto. The guides on both pipeline section ends are disposed parallel to one another and form angles with the planes of the pipeline section end faces, the sum of which angles is equal to the angle of intersection between the planes of the faces. (Hence one of said guides may be parallel to the plane of the guide face describing an angle of 0°, in which case the guide on the other pipeline section would be equal to the angle between the planes of the faces.) The guides on the ends of the spool are similarly arranged parallel to each other at angles to the spool faces the sum of which is equal to the angle of intersection between the planes of the spool faces. The guides on the spool are disposed equidistant with the guides on the pipeline ends. This may be readily achieved by simply providing that the guide planes on each pass an equal distance from the center of the faces of the guides and spools.

Once these parallel guides are arranged, the insertion may be from any angle on the open side of the pipeline sections, i.e., from any angle from which the imaginary line segments can connect the centers of the pipeline end sections and the spool without intersecting the wall of the spool or pipeline section when the spool is oriented with corresponding mating points between the two defining parallel lines.

In accordance with another aspect of this invention, there are provided mechanical guides for guiding pipe sections into alignment and which may be affixed to the spool and pipeline section ends. The guides comprise a removable collar which may be affixed to the pipeline end or spool end and a removable planar guide surface which is affixed to the collar. The guides are preferably removably attached to the collar to enable use of guides having varying angular orientations. Accordingly, guide planes having the precise angular orientation with respect to the pipeline section end or the spool end necessary to achieve the desired angle to insertion of the spool may be placed on the collar for each joinder operation. The guide surfaces preferably further include tracks which enable the guide surfaces of the pipeline end guide and the guide of the mating spool end to engage, defining a linear track along which the spool may be slided to achieve precise positioning between the pipeline ends.

In another aspect, the invention includes a sealing flange which may be desirably used in joinder operations in accordance with this invention. Using the methods and apparatus of this invention, it is possible to construct a spool which will fit within very close tolerances within two pipeline ends. Operating with these tolerances, it would ordinarily be necessary, when seeking to bolt the spool to the pipeline section using flanges, to effect a linear junction between the planar faces of the flange of the pipeline section end and the flange of a mating spool. However, for a permanent leakproof seal, it is desirable to utilize flanges having an intermediate ring movable over the joint between the flanges to prevent extrusion or cold flow of a gasket which is customarily employed and provide a secondary seal.

In accordance with this invention, there is provided a novel flange construction including mating flange members having planar faces and each having a circumferential groove in the rim surface of the flange, the said grooves being arranged to overlie each other when the flanges are joined. A movable sealing ring is provided in one of said grooves, the ring being recessed within the groove to not extend beyond the planar face of the flange. Means are provided to move the sealing ring out of the groove in which it is recessed when the flanges are in engagement, and partially into the groove of the mating flange, thus providing a circumferential seal substantially perpendicular to the plane of the joint between flanges. Preferably, means are provided to introduce a fluid pressure between the sealing ring and the flange in which it is recessed to move the ring from a recessed position to a position extending into the groove of the mating flange. A hardenable material may then be introduced into the volume which was pressurized in order to maintain the sealing ring in position. Thus, a gasket within the ring is blocked from extruding and an additional seal is provided. In addition, the movable ring assists in centering the flanges relative on one another.

In accordance with other aspects of this invention, there are provided devices for handling a spool in a subsea environment to facilitate the insertion procedure between two pipe section ends. For example, an alignment frame device is provided which effects the movement of the pipe in any direction during insertion. A suspension clamp for the spool which enables longitudinally and rotationally balancing the spool for easy diver manipulation is also provided.

Accordingly, the methods and apparatus of this invention provide a systems approach for pipeline repair or joinder. The methods and apparatus proposed enable insertion of a spool between pipeline ends within very close tolerances with minimum hazard of stress or damage to the pipeline and with minimum necessity for diver manipulation.

BRIEF DESCRIPTION OF THE DRAWINGS

The instant invention will be further described with specific reference to the drawings in which:

FIG. 2 is a geometrical diagram representing the ends of two pipe sections that are desired to be connected together by a spool, wherein the pipe ends are represented by circles, $S_1$ and $S_2$, that lie in intersecting planes $P_1$ and $P_2$;

FIG. 3 is a side view of a spool and two pipeline sections having mating guides secured on their ends for properly orienting the spool for insertion between the ends of the pipeline sections;

FIG. 3a is a cross-sectional view of a single connection point suspension mechanism for use in positioning the spool;

In FIG. 9 there is also illustrated a flange design having a movable sealing ring;

DESCRIPTION OF THE PREFERRED EMBODIMENTS

As indicated above, in making underwater tie-ins in connection with either pipeline joinder or repair or riser flow pipe hook-ups, it is necessary to proceed through four distinct phases of overall operation. These phases are: pipeline preparation, determination of pipeline orientation, fabrication of a connecting spool, and installation of the spool.

Figure 1A:
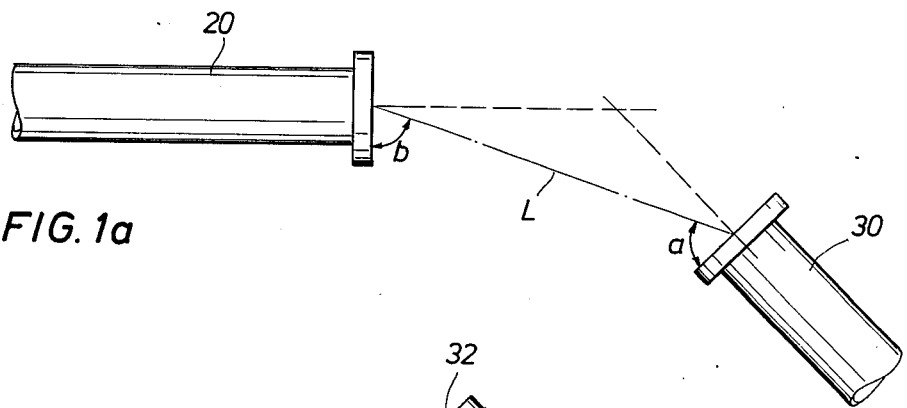
FIGS. 1a and 1b are plan views of two pipeline sections, with FIG. 1a illustrating a desirable disposition of the pipes for interconnection by a spool and FIG. 1b illustrating an unacceptable relative positioning for connection by a spool.

Pipeline preparation is well known and applicable to all techniques in making underwater tie-ins that involve the fabrication of a connecting spool member. Principally, the major requirement is that pipeline ends must be open to one another. The sketch of FIG. 1a illustrates this relationship in contrast to the undesirable situation presented in FIG. 1b. Both figures are schematic plan views of pipeline sections laying on the ocean floor. The pipelines may be disposed at the same elevation, as by laying on a flat bottom, or disposed at different elevations. Further, the pipeline sections to be connected may be tilted with respect to one another.

Briefly stated, the principal requirement of open and opposing pipeline ends is met if the ends are disposed such that the centers of the respective pipeline ends may be connected by an imaginary line which does not intersect the wall of either pipeline section. FIG. 1a reflects this proposition as the imaginary line L connects between the centerlines of the pipes 20 and 30 without having to pass through the wall of either pipe section. As a practical limitation, it is preferable that the ends of the pipeline be so disposed that the imaginary line L forms angles a and b with the planar surfaces of the pipeline ends, which angles are not extremely acute. Preferably, the angle should be so acute as to create a bend in the pipeline which causes an inordinate amount of resistance to flow. Generally, the angles a and b will be greater than 45°, though this invention may be employed to join any pipeline ends open to one another. In addition, it is desirable that pipeline ends also be displaced a sufficient distance apart such that connecting spool will not have to be of a sharp radius of curvature.

Figure 1B:
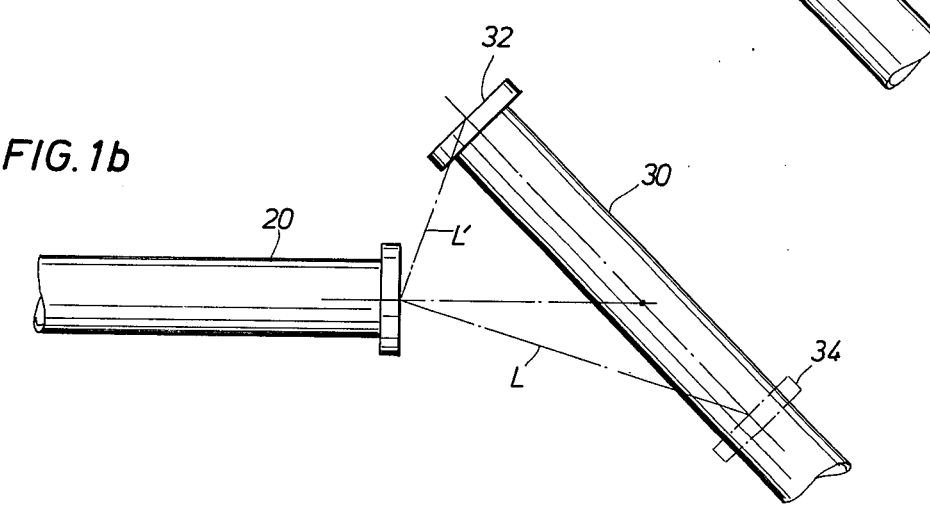

When a situation such as that shown in FIG. 1b is presented, the principal requirement of ends open to one another is not met. As is apparent, the requirement of having an imaginary line connecting the centers of the respective pipeline ends without intersecting the wall of either pipeline section does not exist. Instead, the imaginary line L' connecting between the centers of the pipeline ends must intersect the pipeline section 30 along its length and pass through the wall thereof in order to reach the center of that end. To remedy the situation and present the desired relative positioning that is necessary to meet the requirement of open ends, one of the pipelines could possibly be moved. The more practical approach would likely be to cut off the end of the pipe to a point along the pipe section, as shown in phantom in FIG. 1b such that the ends are open to one another and the principal requirement is met. As shown, an imaginary line L may then be drawn between the centers of the pipeline ends without intersecting the wall of either.

The modification of the pipelines to conform them to the arrangement shown in FIG. 1a is broadly referred to as the "preparation phase" of the tie-in operation and involves the principal requirement that the disposition of the ends be as discussed above. Also, preparation of the ends involves squaring-off the ends such that each end lies in a plane that is perpendicular to the centerline of that pipeline section.

In the case of a long distance between the ends of the pipeline sections to be connected, it is recommended that a straight intermediary spool aligned generally along a line between the ends of pipelines 20 and 30 be provided and that two short connecting spools be used for final makeup. The straight spool would be lowered to the ocean floor with its ends closed to provide enough flotation to permit the spool to be easily set at a location intermediate the ends of the existing pipeline sections and generally along a line connecting the center of the ends. The problem of fabricating two spools having other than a straight configuration would then remain.

The next phase of the operation is that of determining the spatial relationship of the pipeline ends so that the arrangement of the pipeline ends can be simulated by a jig contrived on a deck of the support ship. To obviate large clearance between the flange faces of the spool and the pipeline sections, which condition results in stresses in the pipeline sections upon connection, it is necessary that the spatial relationship of the ends be defined with great precision. Apparatus disclosed in U.S. application Ser. No. 609,196 entitled APPARATUS FOR DETERMINING THE SPATIAL RELATION BETWEEN TWO MISALIGNED MEMBERS, filed Sept. 2, 1975 in the name of Maurice P. Lebourg provides information about the spatial relationship of the pipeline ends with very high precision. The information obtained thereby can be used to build a spool that closely fits the gap between the pipeline ends and permits the use of hard face or flat gasket seals. Alternatively, the less efficient method of welding a template between the pipeline ends might be used. That technique is disclosed in the *OIL AND GAS JOURNAL* article, supra.

The apparatus disclosed in the copending application provides exact relative positioning information about the two pipelines, particularly underwater pipelines, that are to be coupled together without the necessity for construction of a form. The apparatus utilizes first and second gimbal assemblies secured to the ends of the pipelines by templates which establish a reference orientation for the gimbal assemblies relative to one another. Each gimbal assembly is positioned on the end of the pipeline so as to align one of the gimbal axes with an indexing mark on the end of the pipeline, thereby designating it as a reference axis. A telescoping member having a slight negative buoyancy connects between the first and second gimbal assemblies and includes potentiometers which indicate the distance and the circular displacement between the gimbal assemblies, providing that information in the form of measurable electrical quantities. Each gimbal assembly provides pivotal movement of the telescoping member about two coordinate axes with potentiometer mounted on the gimbal assemblies indicating the angular positioning of the telescoping member relative to a coordinate axis. The values of six parameters that define the spatial orientation of the pipeline sections, as represented by electrical quantities are supplied over electrical wires to a remote readout device for display. The disclosure of application Ser. No. 609,196 is incorporated herein by reference to provide a disclosure of how a spool properly indexed as to its position between the pipeline ends may be constructed.

The installation phase of the tie-in operation can be the most tedious and difficult portion of the entire operation. Normally, the fabricated spool is lowered and suspended proximate the gap into which it is to fit with divers attempting to get it into proper position for insertion. While it is apparent that the spool will fit into the gap, in practice the insertion of the spool can be difficult. The spool may be on the order of twenty feet long and as much as four feet in diameter. With a typical wall thickness of about one and one-half inches, the spool might easily weigh several thousands of pounds and be quite cumbersome.

It will likely be the case that several attempts will have to be made before the spool is finally inserted. Many attempts might be made that result in binding of the spool and pipeline ends, inflicting damage to the surfaces of the faces of the spool and pipeline ends and leaving them scratched and marred. To lessen the prospect of flange damage through such binding, the clearance between the faces of the spool flange and the pipeline end flanges can be increased. This approach, however, requires that long bolting techniques be used that result in undesired stress being put into the pipe sections and spool, as well as the joints. Such long bolting also increases diver time needed for installation.

The method of this invention involves determining what can be called the "angle of entry" and "direction of approach" for the spool that permits insertion of the spool without binding of the flanges and then providing oriented guide surfaces to guide the spool smoothly between the pipeline ends. By knowing the angle of entry with accuracy and providing guides, the flange faces may be kept from striking one another during coupling to prevent damage or binding, plus the clearance between the faces can be kept as small as the accuracy of the spool's dimensions permits to make a good sealing joint.

The following described methods and apparatus for installing a prefabricated underwater spool relate to procedures involving the determination and use of the angle of entry and the direction of approach, and the proper orientation of the guide surfaces.

With the information acquired by the spatial orientation surveying apparatus of the referenced application, or from a welded form produced by the technique of the OIL AND GAS JOURNAL article, it is possible to determine the angle of entry and the direction of approach for the prefabricated spool. The exact path to be followed by the spool can then be indicated by guides which may only provide an indication of the entry direction but preferably provide guide surfaces along which the spool may be moved into proper position.

Referring to FIG. 2, there is schematically illustrated the spatial relation of two pipeline section ends to be joined. The ends of the pipelines to be connected are represented by two circles $S_1$, $S_2$. One circle $S_1$ lies in the plane $P_1$ and the other $S_2$ lies in plane $P_2$. The planes are perpendicular to the centerline axes $Q_1$ and $Q_2$ of the respective pipeline ends. The pipeline sections are also open to one another, i.e., the centers $O_1$ and $O_2$ may be connected by an imaginary line L. Also, the pipeline ends represented have marked thereon the indexing points $Z_1$ and $Z_2$, respectively, to designate the orientation of the coordinate system of the surveying apparatus. The relation of these indexing points with respect to the top of each pipe is information that is supplied by the divers. Preferably, the indexing points should be close to the top of the pipeline, and ideally, the indexing points should be aligned with a bolt hole at the top. If the indexing points on the pipeline ends are at or near the top of each pipeline section, the spool may be constructed and oriented following construction with the corresponding indexing points on the surface of the spool directed upwardly, thus enabling an appreciation of the spatial relation of the pipeline sections to be joined, and enabling an informed choice of the most desirable angle of entry to be used. The indexing points are illustrated in positions not corresponding to the tops of the pipeline on FIG. 2 in order to illustrate that the method may be carried out regardless of where indexing points are placed.

Referring again to FIG. 2, planes $P_1$ and $P_2$ which are the planes of the faces of the two pipeline sections $S_1$ and $S_2$ intersect at an angle $2\alpha$ to form a line of intersection I. Imaginary plane $P_5$ bisects the angle of intersection between planes $P_1$ and $P_2$. It will be noted, therefore, that the pipeline section ends $S_1$ and $S_2$ are disposed at an angle to one another and are also at different elevations. Accordingly, lines A-B and C-D which are perpendicular to line I and extends through the centers of sections $S_1$ and $S_2$ and displaced from one another by the distance L.

In accordance with the parallel insertion method of this invention, the spool may be inserted between the pipeline sections $S_1$ and $S_2$ in either of two specific directions $E_2$ and $E_3$. In accordance with this insertion method, the spool faces are aligned to be substantially coplanar with the faces of the pipeline sections and the spool is moved into place with the planar faces of the spool moving in a plane which essentially corresponds to the planes of the faces.

In accordance with the wedge inserting technique of this invention, the spool is moved into engagement with the pipeline section ends most desirably from a direction defined generally by line $E_1$ which is perpendicular to the line I of intersection between the planes $P_1$ and $P_2$ and is in plane $P_5$. However, as will be developed hereinbelow, using the wedge technique, the spool is moved into position from the open side of the pipeline faces (i.e., from a position wherein the centerlines of the spool may be connected by imaginary lines to the centerlines of the pipeline sections without intersecting the wall of the spool or the pipeline sections), and a plurality of angles of entry extending from the directing represented by $E_2$ to the direction represented by $E_3$ may be employed. Most advantageously, however, the spool is inserted from a direction normal to the line of intersection of the planes, that is, in a direction corresponding to line $E_1$.

In both insertion techniques, guides are arranged on both the pipeline ends and the spool ends extending beyond the perimeters thereof, which guides define the angle of entry and enable the spool to be moved positively into position.

Figure 7:
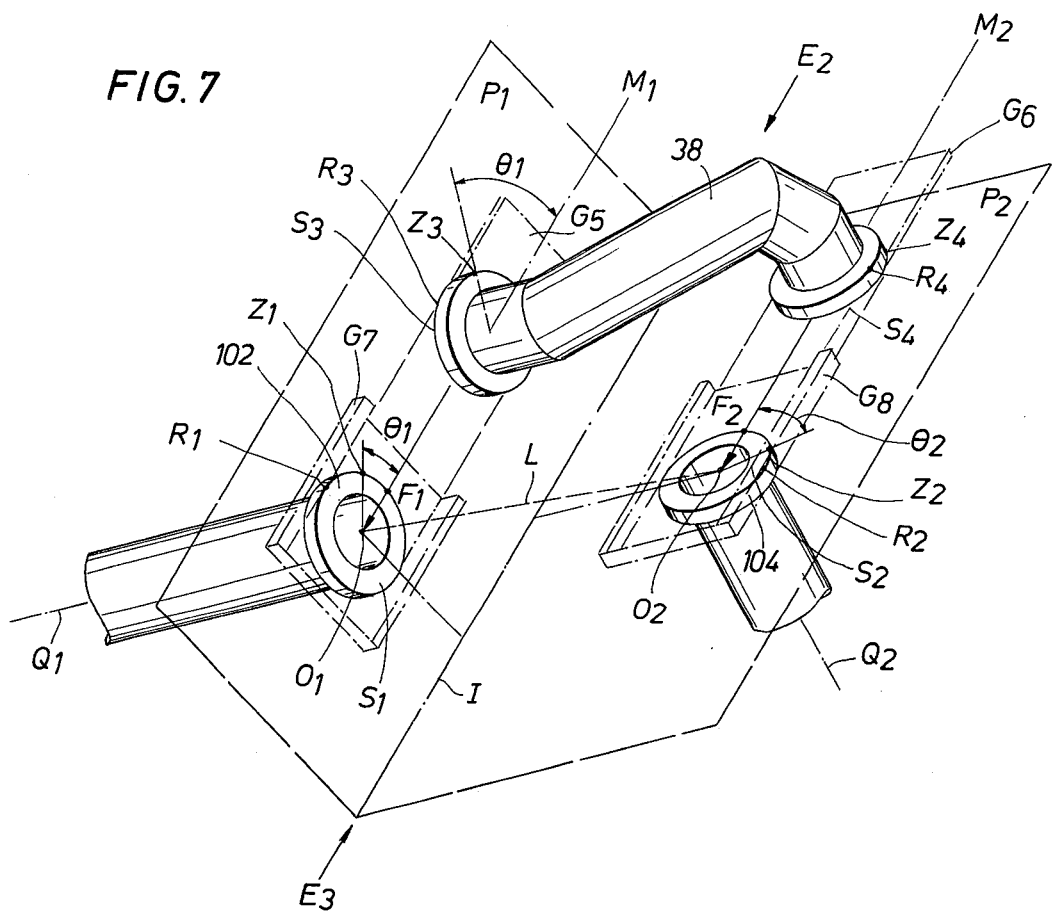
FIG. 7 is a perspective view of a spool, having mechanical guide pieces, that is inserted between the ends of two pipe sections which have mechanical guide pieces that mate with those on the spool.

Referring now to FIG. 7, the manner of accomplishing insertion of the spool between the pipeline ends using the parallel technique will be discussed. Once again, pipeline ends $S_1$ and $S_2$ lying in planes $P_1$ and $P_2$ respectively are open to one another such that their centers $O_1$ and $O_2$ may be connected by an imaginary line L. Indexing points $Z_1$ and $Z_2$ exist at arbitrary selected points on the circumference of $S_1$ and $S_2$, respectively. Corresponding indexing points $Z_3$ and $Z_4$ on the end faces of the spool would align with points $Z_1$ and $Z_2$, respectively, when the spool is in position between the pipeline ends. Indexing points such as $Z_1$ and $Z_2$ must be necessarily determined when the survey of the pipeline end sections is initially taken. Whether the surveying apparatus of the above-referenced application or a welded form is employed, it would be necessary to determine indexing points on the circumference of both pipeline sections in a fashion so that the corresponding indexing points could be found on the spool once constructed.

If the parallel technique is to be used, insertion of the spool will be from either direction $E_2$ or $E_3$ as illustrated in FIG. 7. Assuming, for purposes of explanation, that the ocean floor lies below pipe sections $S_1$ and $S_2$ as illustrated in FIG. 7, the most expeditious manner of inserting the spool using the parallel technique would apprently be from direction $E_2$. Once the most desirable direction of insertion of the spool in determined by a visual survey of the pipeline sections or by virtue of selecting the indexing points at a known position (preferably at the top of the pipeline sections as discussed above), guides may be provided on the spool and pipeline sections to assist the insertion procedure.

When using the parallel technique, the faces $S_3$ and $S_4$ of the spool 38 are moved in planes which are parallel to and virtually coincident with planes $P_1$ and $P_2$ of the faces $S_1$ and $S_2$, respectively. By that is meant that some engineering tolerance must exist between faces $S_1$ and $S_3$ and between faces $S_2$ and $S_4$ when the spool is in mating position between the pipeline ends. Hence, the spool face will move in a plane which is parallel to the plane of the pipeline ends spaced from it by a distance corresponding to the tolerance which has been allowed. In general, the tolerances on each side may be maintained as low as above one-eighth of an inch or less depending upon the size of the spool to be inserted.

Accordingly, it will be appreciated that when using the parallel technique it is desirable to arrange guides $G_5$ and $G_6$ in planes which are parallel to the planes of the faces $S_3$ and $S_4$ and which slightly overhang the faces $S_3$ and $S_4$ in order to allow for the tolerance and to permit the spool to be inserted between the pipeline ends without the faces of the spool and the pipeline ends coming into contact. Accordingly, guides $G_5$ and $G_6$ are arranged coplanar with the faces $S_3$ and $S_4$ and extend in a direction indicated by lines $M_1$ and $M_2$ which are parallel to the line of intersection I between planes $P_1$ and $P_2$ and pass through the center of the faces of the spool end. Guides $G_5$ and $G_6$ may accordingly be positioned without reference to the indexing points since the angle of intersection of planes $P_1$ and $P_2$ and line I may be computed by observing the relative angular disposition of the faces $S_3$ and $S_4$ of the spool. Accordingly, the line of intersection I may be determined and lines $M_1$ and $M_2$ may be determined to orient the guides. Once the guides are oriented in the planes parallel to the planes of the faces $S_3$ and $S_4$ and in directions as defined by $M_1$ and $M_2$, the guides are rigidly secured to the ends of the spool.

At that point, the angle $\theta_1$ between index point $Z_3$ on spool end $S_3$ and $M_1$ which defines the center of guide $G_5$ may be determined. A similar angle $\theta_2$ (not illustrated) may be determined between index point $Z_4$ and centerline $M_2$ of the guide.

Once angle $\theta_1$ has been determined on the spool, the disposition of the corresponding guide structure $G_7$ on the pipeline end beneath the water may be readily determined. The guide structure $G_7$ may then be taken down to the underwater pipe section and affixed to the face $S_1$ to define a planar guide surface which slightly overhangs the face of $S_1$ to allow for tolerance as explained above. If $G_7$ is positioned on pipe face $S_1$ with its centerline displaced from indexing point $Z_1$ by angle $\theta_1$, the guides will be aligned for insertion. A similar procedure is employed to determine the angle $\theta_2$ between index point $Z_4$ on the face of spool $S_4$ and line $M_2$. When guide structure $G_8$ adapted to be fitted on pipe end $S_2$ is then similarly oriented at an angular position of $\theta_2$ from index point $Z_2$, guides $G_6$ and $G_7$ will be aligned to enable insertion of the spool between the pipeline sections.

The method of insertion of the spool 38 between the pipeline sections may be accomplished using an alignment frame which will be discussed hereinbelow.

Now with reference to insertion of the spool by the wedge technique, attention is direction to FIG. 3. When utilizing the wedge technique, the guide surfaces on the spool ends and the pipeline section ends are not disposed in planes parallel to the surfaces of the ends, but are rather disposed such that all guide surfaces are parallel to each other during the insertion procedure. Inasmuch as the two pipeline section end faces $S_1$ and $S_2$ are disposed at an angle $2\alpha$ with respect to one another, the faces $S_3$ and $S_4$ of the mating spool define planes which intersect at the same angle. In order to construct parallel guides from these faces, it is necessary that the guides on each of the pipeline section ends be arranged parallel and at angles to the planes of the faces of the ends, the sum of which angles is $2\alpha$. Similarly, the guides arranged on the ends of the spool must be parallel to form angles with the planes $P_3$ and $P_4$ of the faces of the spool $S_3$ and $S_4$ which likewise total $2\alpha$. In the illustrated embodiment of FIG. 3, guides $G_3$ and $G_4$ have been disposed with their planar surfaces each forming an angle $\alpha$ with the planes of the faces of the spools $P_3$ and $P_4$. It will be understood that, for example, guide $G_3$ might be disposed in the plane $P_3$ of spool end $S_3$. In such event, guide $G_4$ would be required to be displaced parallel to guide $G_3$ and hence would define an angle of $2\alpha$ with plane $P_4$. If the guides were arranged in this fashion, spool 38 in FIG. 3 would be inserted between the pipeline ends along planes parallel to plane $P_1$ of pipeline section face $S_1$. Hence, the angles between plane $P_3$ of face $S_3$ and guide $G_3$ should be chosen and guide $G_3$ should be chosen based upon a visual survey of the pipeline section ends in order to determine the most expeditious angle of entry. It will be understood that the direction of entry may vary from an entry in which the spool is moved along lines parallel to plane $P_1$, along lines parallel to plane $P_2$ (in which case the angle between guide $G_4$ and plane $P_4$ would be zero and the angle between guide $G_3$ and plane $P_3$ would be $2\alpha$) or along any set of parallel lines therebetween. In FIG. 3, a spool 38 is illustrated being inserted between the pipeline section ends along lines parallel to $E_1$ which bisects the angle $2\alpha$ between the planes of the faces $S_1$ and $S_2$. In the preferred mode of conducting the wedge technique, the guide surfaces are placed on the side of the spool furthest from the pipeline section ends when the spool is oriented for insertion therebetween. When the guides are placed on the far side of the spool, they will form angles, the sum of which angles is $2\alpha$ and which angles recede from the face of the spool. On the other hand, the guide disposed on the pipeline section ends are in the illustrated embodiment of FIG. 3 shown to extend toward the spool. In such instances, the guides $G_1$ and $G_2$ will form angles the sum of which is $2\alpha$ which angles overhang the face of the pipeline sections.

However, it will be understood that if desired, the guide surfaces could be placed on the bottom side of pipe section end $S_1$ as illustrated in FIG. 3 and on the bottom side of the spool end $S_3$. In such an instance, the guide surfaces would define a guide plane in the vicinity of $G_{1A}$ on FIG. 3. Recognizing that in inserting a spool using the wedge technique, all guide surfaces are parallel, it is not material where those guide surfaces are placed similarly relative to the faces of the spool and the pipeline section end to be joined. Thus, in FIG. 3, the plane of guide $G_3$ is displaced a distance $d_1$ from the center $O_3$ of the spool face. Similarly, the plane of guide $G_1$ is displaced a distance $d_1$ from the center $O_1$ of the pipeline section end.

On the opposite ends of the spool, distances $d_2$ indicate the same relative placement of guides $G_2$ and $G_4$.

Once the desirable angles between the guide surfaces and the faces of the pipeline section ends and the spools are determined, it remains to determine the orientation of those guides relative to the axis of the spool and the pipeline section ends. It will be appreciated that if guide surfaces $G_1$ and $G_3$, for example, define endless planes which have openings around the pipeline section end $S_1$ and the spool end $S_3$, there would be no difficulty in sliding the spool into mating relationship with the pipeline. However, the guide surfaces $G_1$ through $G_4$ are, of course, finite in size and furthermore define tracks to permit only linear movement of the spool with respect to the pipeline section ends as will be discussed hereinbelow. Accordingly, it is extremely important to orient the guides $G_1$ through $G_4$ relative to the pipeline section ends and the spool ends in order to permit insertion.

Referring to FIG. 2 once again, indexing point $Z_1$ on the perimeter of pipeline face $S_1$ was determined during the initial survey of the pipeline section ends. Indexing mark $Z_2$ on face $S_2$ was similarly determined. Thus, when spool 38 is constructed, corresponding indexing marks which would align with indexing marks $Z_1$ and $Z_2$ are placed on the perimeter ends of the spool ends $S_3$ and $S_4$.

With respect to orientation of the guides, assuming that it is desired to introduce spool 38 between the pipeline section ends from direction $E_1$, perpendicular to line I defining the intersection of the planes $P_1$ and $P_2$, the guides should be desirably centered over points $N_1$ and $N_2$ on the pipeline sections $S_1$ and $S_2$. Points $N_1$ and $N_2$ are defined by diameters of the pipeline sections $S_1$ and $S_2$ which are perpendicular to line I. Corresponding points to points $N_1$ and $N_2$ may be similarly defined on spool 38. Inasmuch as the faces of spool 38 define planes intersecting at an angle $2\alpha$, the points $N_1$ and $N_2$ on the spool may be geometrically ascertained. When points $N_1$ and $N_2$ on the perimeter of the spool are ascertained, the angles $\theta_3$ between point $N_1$ and index point $Z_1$ and $\theta_4$ between $N_2$ and index point $Z_2$ may be ascertained. The guides are then affixed on the spool and centered over points $N_1$ and $N_2$ of the spool. The pipeline section guides are then carried to the underwater pipeline sections and placed thereon with the center of the guide being at the proper angle from the index point $Z_1$ and $Z_2$ on the pipeline section ends.

Should it be determined that the angle of entry would be other than one perpendicular to line I, any such angle of entry may be similarly computed.

Figure 6:
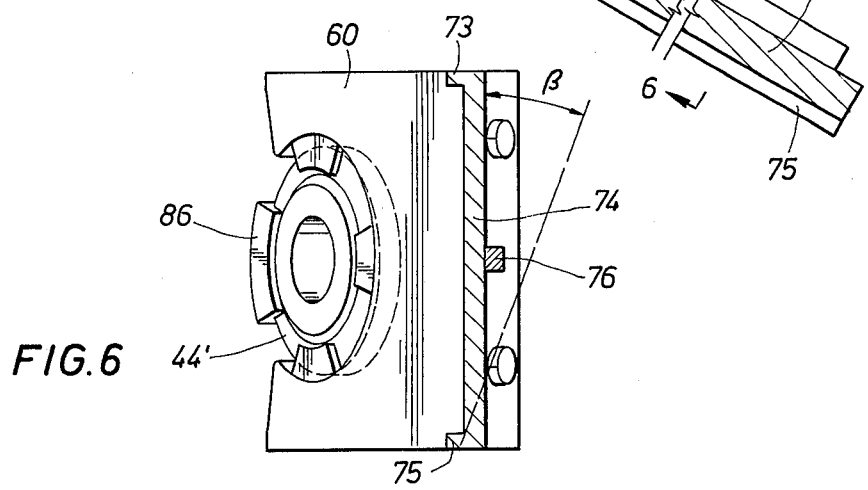
FIG. 6 is a view from the rear of the mechanical guide piece of FIGS. 4 and 5.

In conducting the orientation of the flanges in accordance with this invention, an angle for orientation of the flanges should be chosen so that the spool encounters minimum interference from subsea obstacles recognizing that in the preferred embodiment the tracks or channels on the guides require that the spool be moved into position along lines or tracks on the guides. Thus, in the method discussed, the lines or tracks would be parallel to lines AB and CD through points $N_1$ and $N_2$. However, a direction for the tracks corresponding for example to lines UV and WX might be chosen. In such a case, the guides would be centered over points $Y_1$ and $Y_2$, and the tracks on the guides would be parallel to lines UV and WX. In such a circumstance, it will be noted that the planes of the guides will nonetheless be required to be parallel. Thus, if a guide were centered over points $Y_1$ and $Y_2$, it will be understood that the base of the guide would not exist in a line within the plane of the face. (Note that points $R_1$ and $R_2$ at the base of the guides $G_1$ and $G_2$ represent the end view of lines $R_1$ and $R_2$ which are in planes $P_1$ and $P_2$, respectively.) If parallel planes were to be centered over $Y_1$ and $Y_2$, the guides would nonetheless be required to be in parallel planes such as planes of $G_1$ and $G_2$ and the face of the guide would be at an angle to the faces $S_1$ and $S_2$. (See, e.g., dotted line on FIG. 6 showing the base of angle between the base of the guide and the plane of the face.)

Hence, it is preferred using the wedge technique to use an approach track perpendicular to the line of intersection between the planes of the pipeline end faces (i.e., a track parallel to lines AB and CD). Using this approach angle, the guides are not required to be turned to the side at the base thereof relative to the faces of the pipeline ends or the spool ends.

However, if such an angle of approach is desired because of existing subsea obstacles, the angle between the desired approach track and the indexing points may be determined and the guides properly centered.

Using either the parallel or wedge technique, the angle of entry and the guide orientation may be determined by geometrical layout or by computer. Since the surveying apparatus provides complete information about the orientation of the pipelines, the data supplied could be entered into a computer and processed according to programs that could calculate the best angle of entry and the necessary guide orientations with respect to the indexing points and print out the answer.

After the guides have been placed on the ends of the spool and the pipeline sections, the fabricated spool may be lowered to a position proximate the open gap between the pipeline ends. The guides in accordance with a preferred aspect of this invention will provide engageable surfaces or tracks to slide the spool into position. It is desirable that the guides on the pipeline and spool ends engage before the ends of the spool get close to the ends of the pipeline sections. Accordingly, the guide tracks on the ends of the pipeline sections should be sufficiently long as to engage the mating guides on the spool ends before the spool ends touch the pipeline ends. It is, of course, possible to have the spool guides extend out and be long enough to engage the pipeline end guide tracks prior to contact between the pipeline and spool ends. Reference guide indicators could, for example, be visual guides in the form of rods or otherwise that define planes which indicate the manner in which and direction from which the spool may be inserted. While the alignment and positioning of the spool can be done by visually aligning the reference guide indicators, the work of the personnel performing the operation is greatly simplified with mechanical guidance to assist in positioning the spool.

Figure 4:
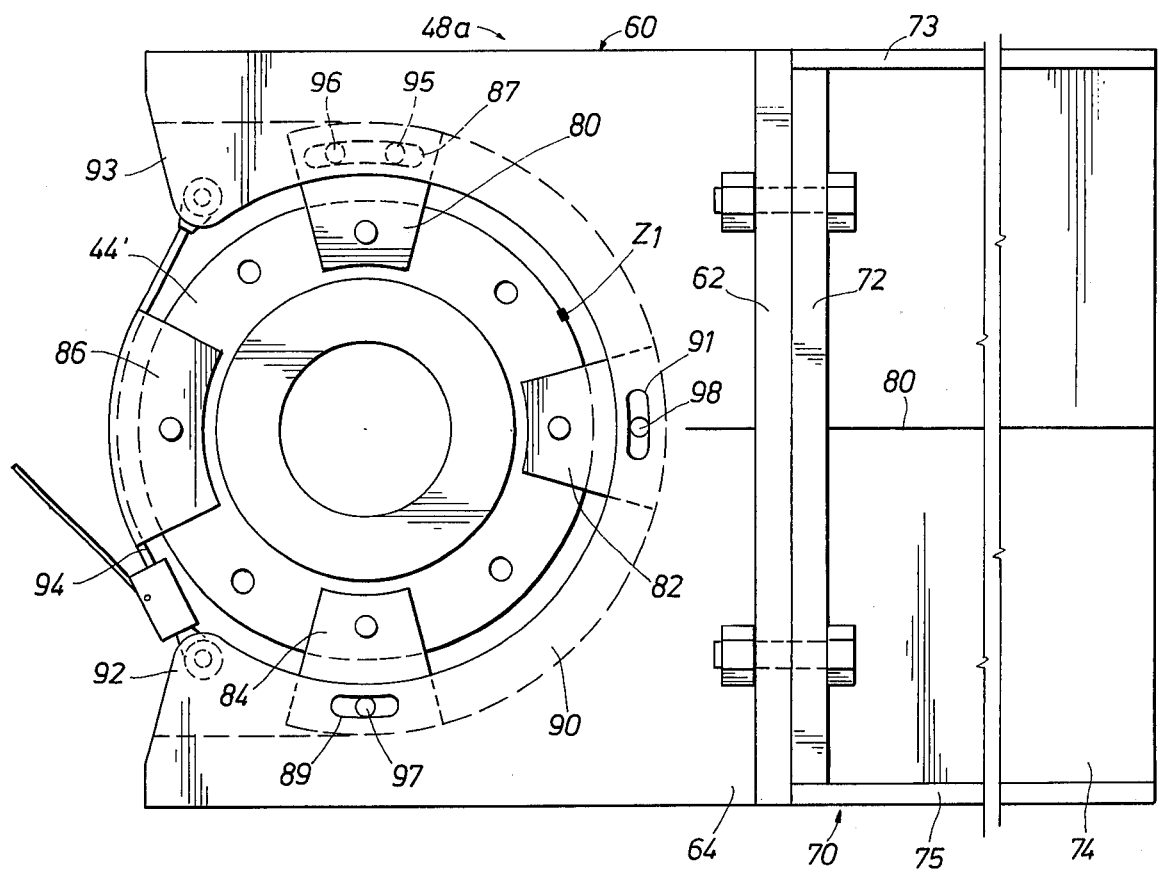
FIG. 4 is a side view of a mechanical guide piece for attachment to the end of a pipeline section to which a spool is to be connected.
Figure 5:
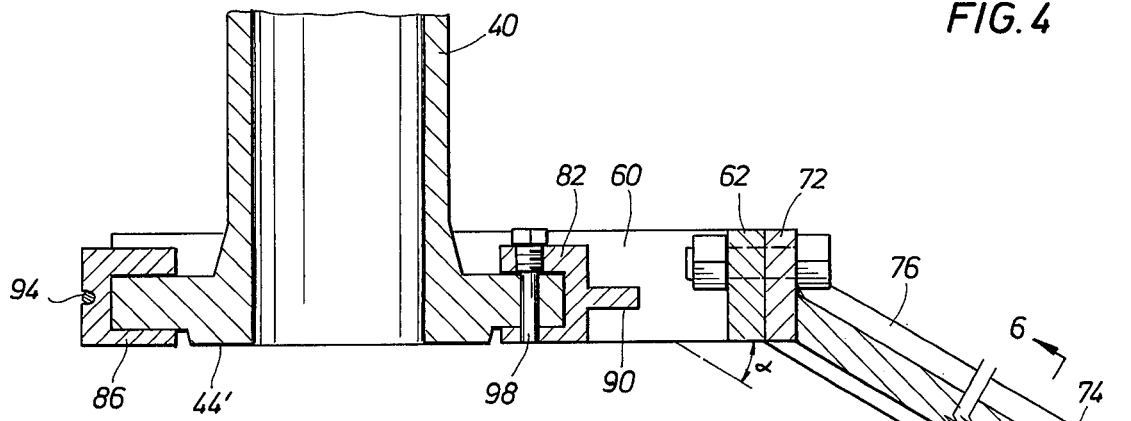
FIG. 5 is a plan view of the mechanical guide piece of FIG. 4.

With regard to FIGS. 4, 5 and 6, guide 48a which provides a suitable structure for guides $G_1$ through $G_4$ is shown. The view of FIG. 4 is that looking down the centerline axis of pipe section 40, perpendicular to the face of the flange. As will be appreciated, the angle $\alpha$ may vary depending upon the orientation of the pipe ends to be connected as described above. Thus, for each situation a different guide arrangement may be required when using the wedge technique to provide guides having parallel surfaces which are skew by some angle such as $\alpha$ from the plane of the pipe face. When operating by the parallel technique, the guides are parallel to the faces and hence angle $\alpha$ would be zero. In view of the necessity to readily accommodate various pipe section orientations, the guide 48a is comprised of a collar, generally referenced by the number 60, and a separate, but attachable guide section referenced by the number 70.

Broadly speaking, collar 60 mounts onto the end of the pipe section in a manner to be more fully discussed hereinafter, such that the guide section 70 will be disposed at the proper angle of entry. Collar 60 includes a flange plate 62 welded to a backing plate 64 to provide a point of attachment for guide section 70. The illustrated guide is for use in the wedge technique when the approach angle is perpendicular to the line of intersection of the pipeline faces (i.e., through points $N_1$ and $N_2$ in FIG. 2). If an approach angle such as UV is desired to be used, the base of the plate will not be in the plane of the face of the pipe 40. The base of the guide may be disposed at some angle such as angle $\beta$ as shown in FIG. 6. Under such circumstances, it would be desirable that flange plate 62 be wider in order to facilitate mounting guide section 70 thereon.

When using the wedge technique, after the angle of intersection of the planes $P_1$ and $P_2$ is determined, as by geometrical layout or by computer techniques, the necessary guide section 70 can be fabricated. It will likely be required that a jig be contrived such that good precision may be attained in the constructed guide section. In any event, the guide section 70 shown comprises a flange plate 72 that will match up with the flange plate 62 of the collar 60. Extending away from and welded to flange plate 72 is a guide runner 74 having rails 73, 75 which, as shown in FIG. 6, form a channel into which the mating guide 46a ($G_3$) on spool end 39 is insertable. Guide section 70 is attached to flange plate 72, such that when guide section 70 is attached to collar 60 (see FIG. 5), it will be at the skew angle $\alpha$.

A construction identical to that of guide 48a may also be utilized for the other guide 48b. The mating guide pieces 46a and 46b may be similar in design except, of course, that they will not form a channel. The guide pieces 46a, 48a will have only a vertical plate that is of a width that permits an easy, through close, fit into the channel on guide section 70. Also with regard to FIG. 6, it is pointed out that it may be desirable to provide guide section 70 with a support gusset 76, and similarly provide guide piece 46a with a gusset.

As well as being disposed at the proper skew angle, the mechanical guide used must also be properly positioned about the circumference of the pipeline section end or spool end to which it is attached in order that the guide path defined by the channels thereby will be at the proper angle. As discussed above, index points were employed to center the guides at the proper angle relative to the circumference of the spool and the pipe section ends. The guide section 74 of the guide piece 48a must have its guide runner 74 designed such that the top and bottom rails 73, 75 will be parallel to the line defined by the center of the spool as it is moved between the pipe sections. If desired, a reference guide indicator line, such as that of line 80 may be scribed onto the mounting and guide sections of guide piece 48a.

Although proper setting of collar 60 along the circumference of the pipeline end 44 could be done underwater, it is preferable not to do so if at all possible because of the additional diver time required and its attendant expense. Therefore, it is desirable to have a guide piece that is preset at the surface, requiring only that the diver carry it down to the pipe end and bolt it into place. The collar illustrated in FIGS. 4 and 5 provides the capability of predetermining the proper disposition of the collar 60 along the circumference of pipeline end 44.

Thus, when the spool is fabricated and the angle of insertion or angle of entry is decided upon, the guides may be affixed to the ends of the spool. Determination of the angle of entry or insertion technique to be used will determine the skew angle, if any, between the planes of the guide and the planes of the ends of the spool, and an adequate guide may be fabricated by welding a guide plate such as 74 at the proper angle to collar 60. The guide is then oriented circumferentially so that the tracks of the guide on the spool define the desired angle of entry or insertion.

In order to preset the collar 60 to dispose the center of the guide plate 74 at the proper angle with respect to the indexing point on a pipleine end, the mating guide piece on the corresponding end 39 of the spool 38 of FIG. 3 is first secured onto the spool and circumferentially disposed at the proper angle with respect to the indexing point. A dummy flange 44' having a size and configuration identical to that on the end of the underwater pipeline is bolted to collar 60 of guide piece 48a, as shown in FIG. 5, through mounting lugs 80, 82, 84, 86 carried in collar 60. As shown in FIG. 5, mounting lugs 80, 82, 84 are disposed and slidable in groove 90 formed in collar 60. The lugs are retained in the groove by bolts 95, 96, 97 and 98 through collar 60 and the portion of the lugs within the groove. The bolts such as 98 are through slots such as 91 in the collar 60 which enables the lugs to be tightened at various positions within the groove, the slot is sufficiently long to at least permit the lug to be aligned over two adjacent boltholes on the flange. Thus, collar 60 to which guide runner 74 is attached is rotatable about the centerline of dummy flange 44', riding on the mounting lugs. A cable 94 extends between ears 92, 93 and engages mounting lug 86 in a groove formed therein.

With the collar and guide runner mounted on the dummy flange 44', at approximately the proper angular displacement from the indexing point the guide piece 48a is then engaged with the mating guide piece on the spool, and the dummy flange 44' is held adjacent the flange on the spool end 39. Bolts 95 through 98 are loosely within slots 87, 89 and 91 enabling the dummy flange to be rotated through a limited angle. The dummy flange can then be bolted to the spool flange to secure alignment of the flanges while bolts 95, 96, 97, 98 extending through mounting lugs 80, 82, 84 and collar 60 are tightened to fix the relative positioning of the collar and the mounting lugs. Notice is taken as to which bolt hole on the dummy flange, with respect to the indexing point $Z_1$ that mounting lug 80 is matched with. The guide piece 48a may then be taken off the mating guide and the dummy flange removed.

To properly install the guide piece 48a on the pipeline end underwater, the only information that the diver is required to have is knowledge of which bolt hole on the flange, with respect to the indexing point, that the mounting lug 80 is to be matched with. Typically, the information required by the diver can be expressed, in the case of the illustrative example of FIG. 5, as "the second bolt hole counterclockwise of the indexing point".

Figure 9:
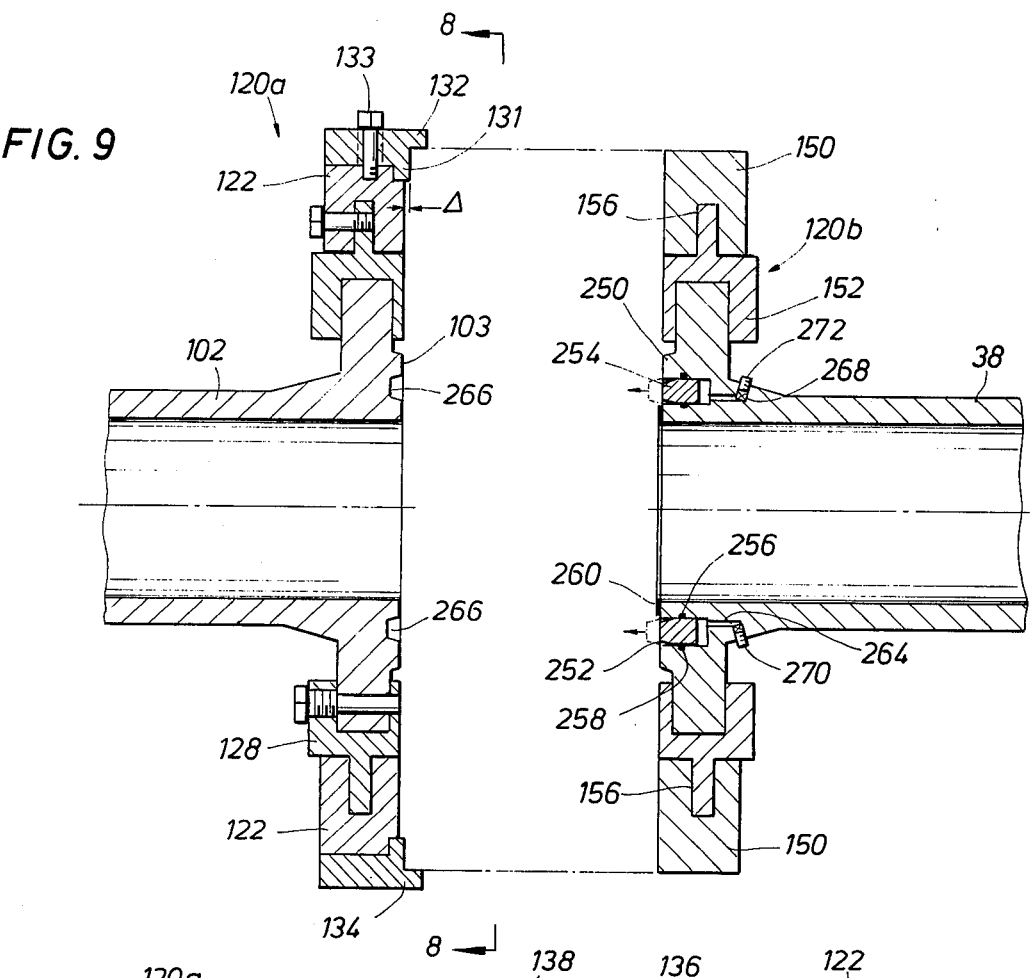
FIGS. 8 and 9 are plan and cross-sectional views, respectively, of the mechanical guide piece in use on the pipe ends shown in FIG. 7.
Figure 8:
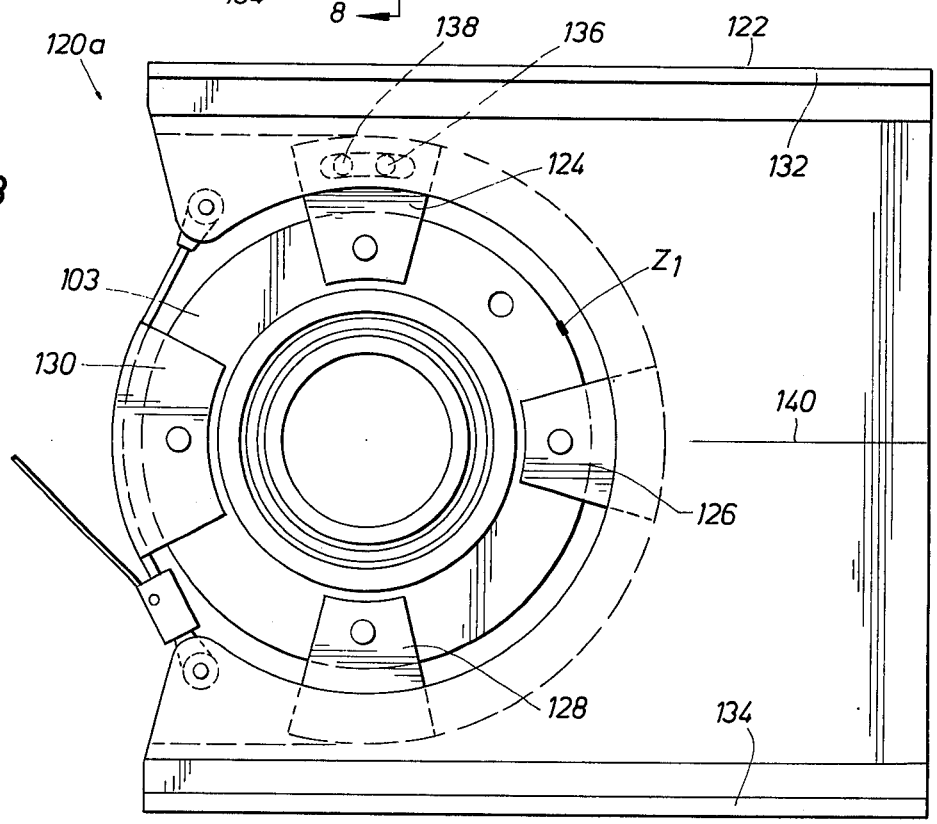

Referring to FIGS. 8 and 9, there is illustrated a suitable mechanical guide to be used in connection with the parallel technique. The guide is similar in many ways to the guide that is used with the wedge technique. For example, the guide piece 120a that is to be mounted on the pipe end 102 in FIG. 7 includes a collar 122 that mounts to the pipe end by four mounting lugs 124, 126, 128, 130 which are held in a groove in the collar. Upper and lower guide rails 132 and 134, respectively, extend along the upper and lower edges of collar 122 to define a channel that is perpendicular to the centerline axis of the pipe end 102. As shown in FIG. 9, the upper rail 132 is adjustable by means of a slotted hole therein and a bolt 133. As shown, rail 132 and the depending extension 131 is displaced a slight distance Δ beyond the plane of the face of flange 103. The exact amount of displacement over the edge is adjustable by loosening bolt 133 and sliding rail 132 to the proper position. It is necessary to provide the clearance Δ in order to prevent gasket 260 or another protrusion beyond the face of either the spool or pipeline flanges from being deformed as the spool is moved into position. With rail 132 so disposed, the spool flange is permitted to slide past the gasket without coming into contact with it.

As defined previously, the angle of entry is that angle between a radial line extending from the centerline of the pipe end to the indexing point thereon and a line through the centerline of the pipe end that is parallel to the intersection of the planes of the pipe ends to be connected. Any reference guide indicator must be disposed on that line or define a path that follows a course along that line. Accordingly, the guide path defined by the rails 132, 134 must be along that line; and as shown, the rails are parallel to that line represented on guide piece 120a by a scribed line 140. The angle of entry is that between indexing point $Z_1$ and line 140 with guide 120a being preset in the same manner as the guide 48a of FIGS. 4, 5 and 6.

Further illustrated in FIG. 9 is the guide piece 120b on spool 100 that mates with guide piece 120a. A collar 150 mounts to the end of the spool by mounting lugs, such as lugs 152 and 154, which are slidable in a groove 156. Collar 150 carries no guide rails, but is instead adapted to be slidably insertable into the guide channel defined between rails 132 and 134 of guide piece 120a. For proper mating of pipeline and spool ends, collar 150 must be disposed about the circumference of the spool end such that it is properly aligned at the angle of entry. Presetting of guide 120b is by rotating collar 150 about the spool end until the proper angle with respect to the indexing point thereon is reached.

Often, a spool that is to be positioned between two pipe sections will be of rather large and unwieldy physical proportions. Accordingly, it would be very difficult for work personnel to manually position the spool. It is desirable that some type of mechanical assistance be given in this regard, such as some type of power mechanism that will support and move the spool into position.

Figure 10:
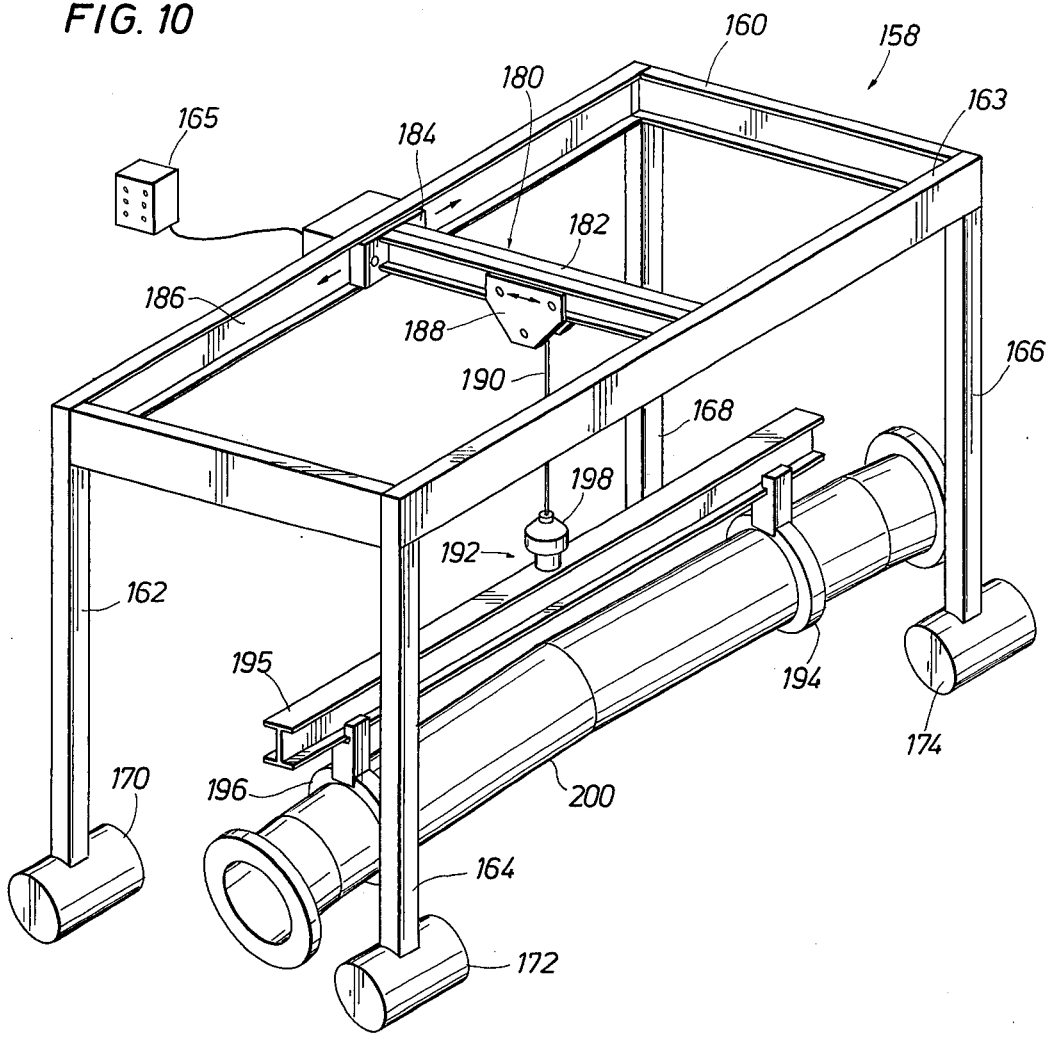
FIG. 10 is a perspective view of an alignment apparatus for assisting in the positioning of the spool.
Figure 11:
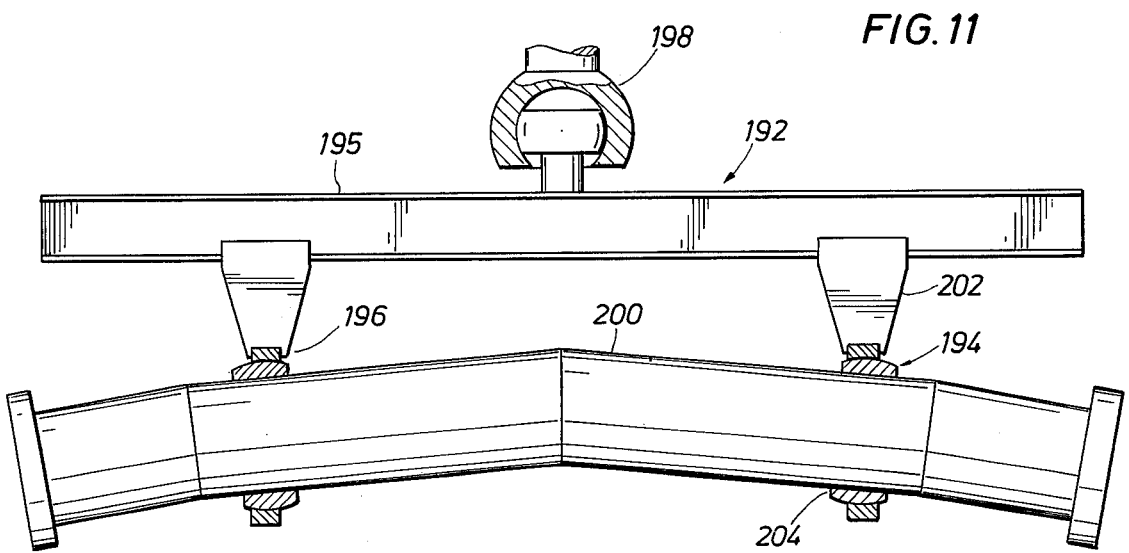
FIG. 11 is a side view and partial cross-section of an alternate suspension apparatus to that of FIG. 3a for suspending the spool at two points.

Referring to FIGS. 10 and 11, there is shown one suitable approach to providing the needed mechanical power assistance. Involved is an alignment apparatus 158 comprising a frame 160 standing on legs 162, 164, 166, 168 having feet 170, 172, 174, 176 attached thereon. The frame 160 includes a carriage mechanism, generally designated by the reference numeral 180 which includes a beam 182 that extends across the opposing sides 161 and 163 of frame 160. A carriage block, for example, that designated by reference numeral 184, is secured to each end of beam 182. The carriage blocks ride in a guide channel formed in the opposing frame rails 161 and 163. For example, carriage block 184 is movalbe along in guide channel 186. In addition to the carriage blocks on the ends of beam 182, there is disposed for lateral movement a power winch 188 riding in a track on beam 182 and having a line 190 depending therefrom which is attachable to the spool support 192. Suspending the spool from a single point on the frame assists in orienting the spool properly for insertion.

Both carriage block 184 and movable winch 188 are adapted for powered movement along their respective guide channels. For example, hydraulic or electric motors could be utilized along with gear tracks to provide them with motive power. Movement of the carriage 180 and the operation of the winch is controlled through a control box 165. Easily manipulatable switches or buttons are provided on the control box to move beam 182 forward and backward relative to frame 160, to move winch 188 laterally along beam 182 and to move the winch cable 190 up and down.

The spool support 192 attached to winch line 190 serves to rotatably suspend spool 200. As best shown in FIG. 11, an I-beam 195 has a swivel connection 198 secured thereon which constitutes the point of attachment for winch line 190. Swivel connection 198 secured thereon which constitutes the point of attachment for winch line 190. Swivel connection 198 is a ball and socket arrangement whereby the beam 195 is fully swinging and easily tiltable. Disposed near each end of beam 195 are spool hangers 194 and 196 which are movably adjustable on beam 195 to accommodate the spools of various lengths can be accommodated and to balance the spool longitudinally from the single point of suspension.

Spool hangers 194 and 196 have an attachment member 202 that is slidable along and securable to beam 195 at its upper end and carries a bearing 204 on its lower end. The inner race of bearing 204 is movable not only rotationally with respect to the outer race, but is also laterally movable with respect to it as well. So constructed, spool hangers 194 and 196 permit a spool held regardless of spool curvature.

By properly positioning spool hangers 194 and 196 on beam 195, and securing hangers 194 and 195 to the proper places on the pipeline, the spool is held in a level and balanced condition within the frame and also may be balanced around its longitudinal rotational axis. Most frequently, the spool will not be inserted between the pipeline ends from a level orientation. However, the balanced condition of the spool will facilitate diver manipulation of the spool to tilt or rotate the spool to orient it properly for engagement of the guides and insertion of the spool. Hence, the suspensioned systems disclosed will provide for balanced rotation around the longitudinal axis of the spool and longitudinal balance to readily permit tilting.

Referring again to FIG. 3 and also to FIG. 3a, one suitable suspension mechanism for hanging spool 38 from the winch line 90 is shown. The mechanism provides a single point connection in contrast to the two point connection scheme that is used in the mechanism of FIGS. 10 and 11. The winch line 90 attaches to an outer bearing race 220, which as shown in FIG. 3a is a split-ring. An inner race 222, also a split-ring, is rotatable within outer race 220, and is further capable of lateral movement with respect to the outer race.

The spool is required to rotatable to permit alignment and engagement of the guide pieces on the spool and pipeline ends. However, since the spool will typically not be a straight section, the mass of the spool will not be uniformly distributed about the centerline axis 224 of the spool. The spool is first engaged at the longitudinal center of gravity, the point along its length with equal mass on each side of the suspension mechanism, to balance the spool longitudinally. The spool then must be balanced with respect to the axis of rotation of the bearing to place the centroid or center of mass CM of the spool on that axis (midway between the surfaces or race 220), and thereby achieve rotational balance around that axis. To provide adjustment of the spool 38 with respect to the bearing, spool 38 is mounted in the inner race by an adjustable auxillary ring 226, which is also of a split-ring design.

Referring specifically to FIG. 3a, the auxilliary ring is adjustable by three stanchions 228, 230, 232 that are carried by the inner race 222 and disposed symmetrically therearound. The stanchions comprise bolts that extend toward the centerline of the inner race and into contact with the auxilliary ring 226. The stanchions are adjusted to support the auxilliary ring within inner race 222 such that the controid of the spool will be on the longitudinal axis of rotation of the bearing and an equal mass will be on each side of the axis.

In use of these suspension devices, the spool will be suspended in the frame on board ship prior to being lowered for insertion between the pipeline ends. Hence, proper balance is achieved before spool insertion is began.

The foregoing description of the frontal entry method and the lateral entry method have been illustrated using pipeline ends having flanges. It is to be noted, however, that both methods and the mechanical guides described for use with each method may also be applied to spool installation between pipe ends without flanges. In such a case, the spool ends would be welded to the pipe ends. If the welding of the spool is preferred, special split flanges can be clamped onto the spool and pipe ends, presenting a simulated flanged end. Mechanical guides as previously described can then be secured to the flanges. The guide used will, of course, depend upon the particular method being used. After the spool is inserted between the pipe ends according to one of the methods described herein, an alignment frame with clamps can be secured to the spool and pipe ends to hold them during the welding operation. The use of alignment frames and welding clamps are well known and form no part of this invention. With the spool and pipe ends being held in fixed relation for welding, the mechanical guides and split flanges can then be removed. Welding takes place in a conventional manner.

Assuming that a flange connection is desired, it is important to protect against leaks. As a rule, leakage is primarily attributable to improper initial alignment of the flanges. Thus, if flanges are bolted together to force the flange faces into alignment, leaks are probable. The apparatus and techniques of the instant invention and that of the referenced application serves to greatly reduce spool flange and pipe flange misalignment. To further enhance leakage protection, the spool may advantageously be outfilled with the flange illustrated in FIG. 9. The flange is adapted to match the ring joint flanges on the pipes.

The flange 250 shown in FIG. 9 uses what may be termed a piston type ring seal 254 to provide secondary sealing, retention of the flat seal 260, and centralization of the flanges 250 and 103 to relieve shear stresses on the seal 260 and the bolts.

Specifically, the flange has a deep recess groove 252 into which a ring seal 254 is disposed. Double O-ring seals 256 and 258 are also provided that extend about the inner and circumferential surface of ring seal 254. An upper passage 262 and a lower passage 264 extend from the rear or recess groove 252, opening to the outside behind the flange. Near the outer opening of the passages, tapering threads are provided for accepting a tapered plug thereinto to close off the passage.

Installation of this type of spool flange involves going down with passages 262 and 264 unplugged, permitting equalization of pressure on each side of seal 254. After the spool is in position between the pipeline ends to be connected and with gasket 260 in contact, the lower passage is closed and water pressure is applied through the upper passage 262. The water pressure applied must be sufficient to cause a piston type ring seal 252 to be urged from within recess groove 254 and engage a groove 266 in the opposing flange 103, which groove is concentric with and of an equal diameter to the recess groove 252. Typcially, only about 100 p.s.i. will be necessary. Engagement of the ring seal 254 with groove 266 will centralize the flanges. With water pressure being maintained, all bolts are tightened. The lower plug may then be removed and a check valve placed in upper passage 262.

With ring seal 254 properly positioned, a hardenable material, such as epoxy, is introduced through the upper passage into groove 252 behind seal 254, causing any water therein to be flushed out through the lower passage. The lower passage is next plugged with plug 270 and sufficient pressure is applied to the flow of hardenable material to completely fill the void in groove 252 behind seal 254 with the check valve 268 in the upper passage retaining pressure on the seal 254. A second plug 272 may then be inserted over the check valve.

As will be appreciated, the method and apparatus disclosed above provide a system for insertion of a spool between undersea pipelines. Variations from the disclosed embodiments may be indulged without departing from the invention, however. For example, the guides which are disclosed as positioned on one side of the pipeline and spool might straddle the pipeline. The methods disclosed will enable determination of a number of useful guide planes which may be used. Furthermore, the guides need not be planar as illustrated but need only define planes. Thus, for example, a pair of rods on the spool which are received into sockets mounted on the pipe might be used. Alternatively, the guide on one member might include wheels designed to ride in tracks of the other. The apparatus for suspending and inserting the spool may also vary from the disclosed embodiments. For example, the spool could be suspended from an A-frame and be manipulated positively by means of a hydraulic system. Nonetheless, balancing the spool for tilting or rotational movement is desirable to minimize effort, whether by hand or mechanically, in orienting the spool. The above and other variations will be appreciated by those skilled in the art.

What is claimed is:

1. A method for installing a spool fabricated to fit between the circular ends of two pipeline sections to define corresponding pipeline and spool faces when joinder is complete, said ends of the two pipeline sections being disposed such that the centers of the pipeline section ends can be connected by an imaginary line segment which does not intersect the wall of either pipeline section, and which pipeline ends lie in intersecting planes comprising the steps of:

orienting the spool for insertion between the pipeline ends such that the corresponding points on the mating spool and pipe end faces define parallel lines, and imaginary line segments may be extended from the center of each pipeline section end to the center of the corresponding spool end to which it is to be joined without intersecting the wall of the pipelines or the spool;

affixing guides to said pipeline ends and to the spool end defining planes parallel to the line of intersection between the planes of the pipeline ends and parallel to the line segments between the centers of the pipeline end and the corresponding end of the spool;

said guides extending beyond the perimeter of the pipeline ends and of the spool ends;

engaging the guides on said pipeline ends with the guides on the corresponding ends of the spool; and moving said spool into mating position with said pipeline section ends so that all the points on the spool travel along lines parallel to the planes of said guides while maintaining said guides in engagement.

2. The method of claim 1 wherein said guides define planes parallel to the plane of the face of the member to which the guide is attached.

3. The method of claim 2 wherein the guides on each pipeline end and the corresponding spool end engage each other for relative sliding movement of the guides along a line parallel to the said line of intersection.

4. The method of claim 1 which comprises the additional steps of:

ascertaining the angle of intersection of the planes of the faces of the pipeline ends;

arranging the guides on each of the pipeline section ends parallel to each other to form angles with the planar faces of the pipeline ends, the sum of which angles is equal to said angle of intersection;

arranging the guides on the spool ends parallel to each other and equidistant as the guides on the pipeline ends, the guides on said spool ends forming angles with the planar faces of the spools, which are equal to the angles formed by the guides on the pipeline ends with the corresponding faces of the pipeline ends.

5. The method of claim 4 wherein the angles between each of the guides and the planar faces of the pipeline end or spool end to which it is affixed is equal to one-half said angle of intersection.

6. The method of claim 4 wherein said guides extend beyond the perimeter of said pipeline ends in a direction generally toward the spool when oriented for insertion, and wherein the guides extend beyond the ends of the spool in a direction generally away from the pipeline ends when the spool is oriented for insertion.

7. The method of claim 4 wherein the spool is moved into position between said pipeline ends along parallel lines which are perpendicular to the line of intersection of the planes of the faces of the pipeline ends.

8. The method of claim 1 wherein said guides extend sufficiently beyond the perimeter of the pipeline end and the spool ends to permit engagement of said guides prior to any contact between the corresponding faces of the pipeline ends and the spool.

9. The method of claim 1 wherein said guides are spaced to maintain a clearance between the pipeline section end and the corresponding spool end when the spool is in mating position between the pipeline section ends.

10. A method for installing a spool fabricated to fit between the ends of two underwater pipeline sections to define corresponding pipeline and spool faces when joinder is complete, said ends of the two pipeline sections being disposed such that the centers of the pipeline section ends $0_1$ and $0_2$ may be connected by an imaginary line segment L which does not intersect the wall of either pipeline section, said end faces of said pipeline sections lying in intersecting planes $P_1$ and $P_2$, and the said spool ends lying in intersecting planes $P_3$ and $P_4$, the said intersecting planes forming the angle $2\alpha$ therebetween, which comprises the steps of:

placing guides on the ends of the pipeline sections and on the ends of the spool, which guides extend beyond the perimeter of the pipeline section and the spool to which such guides are attached;

the guides on said pipeline ends defining parallel planes $G_1$ and $G_2$, which planes (1) are also parallel to the line of intersection between planes $P_1$ and $P_2$ and (2) form angles with planes $P_1$ and $P_2$, the sum of which angles is $2\alpha$;

the guides on said spool ends defining parallel planes $G_3$ and $G_4$ which planes (1) are spaced equidistantly as are planes $G_1$ and $G_2$ (2) are parallel to the line of intersection between $P_3$ and $P_4$ and (3) form angles with planes $P_3$ and $P_4$ the sum of which angles is $2\alpha$;

the planes $G_1$ and $G_2$ defined by the guides on the pipeline section ends being equidistant from the centers $0_1$ and $0_2$ of the faces of each pipeline section as are the planes $G_3$ and $G_4$ defined by the guides on the corresponding spool faces are from the center of the spool faces $0_3$ and $0_4$;

engaging the guides on the pipeline section ends with the guides on the corresponding spool ends; and moving said spool into position between the pipeline ends with said guides in engagement.

11. The method of claim 10 wherein planes of the guides on corresponding pipeline section ends and spool ends are centered above a point on the perimeter of the pipeline section ends and the spool ends determined by a line perpendicular to the line of intersection between the planes of the faces of the pipeline ends and of the spool ends and passing through the center of the pipeline end faces and spool end faces.

12. The method of claim 10 wherein each of the angles between the planes $P_1$ and $P_2$ of the pipeline section end faces and the planes $G_1$ and $G_2$ defined by the guides thereon is equal to $\alpha$.

13. The method of claim 10 wherein said guides define guide tracks which permit the guides to be engaged for lineal movement relative to one another.

14. The method of claim 10 wherein the said guides maintain a clearance between the faces of the pipeline ends and the spool ends when said pipe ends and spool ends are registered in mating relationship.

15. A method for installing a spool fabricated to fit between the circular ends of two underwater pipeline sections to define corresponding pipeline and spool faces where joinder is complete, said ends of the two pipeline sections being disposed such that the centers of the pipeline section ends can be connected by an imaginary line segment which does not intersect the wall of either pipeline section, and which pipeline ends lie in intersecting planes, comprising the steps of:

placing guides on the ends of the pipeline sections and on the ends of the spool, which guides extend beyond the perimeter of the pipeline section ends or spools on which they are placed;

the said guides defining planes parallel to the face of the pipeline section end of spool end on which such guide is placed;

engaging the guides on each pipeline end with the guide on the corresponding spool end;

moving said spool into mating position between said pipeline ends in a direction parallel to the line formed by intersection of the planes $P_1$ and $P_2$ of the faces of the pipeline section ends with the guides in engagement.

16. The method of claim 15 wherein the planes defined by the guides are substantially in the planes of the faces of the pipeline section ends and the spool ends.

17. The method of claim 16 wherein the guides extend sufficiently beyond the perimeter of said pipeline section and said spool to permit engagement of said guides prior to contact between the surfaces of the pipeline sections ends and the ends of the spool.

18. The method of claim 15 wherein said guides on said pipeline section ends engage said guides on said spool ends for relative motion between such guides in a direction parallel to the line of intersection between the planes $P_1$ and $P_2$ of the faces of the pipeline sections.

19. A method for installing a spool fabricated to fit between the circular ends of two underwater pipeline sections to define corresponding pipeline and spool faces where joinder is complete, said ends of the two pipeline sections being disposed such that the centers of the pipeline section ends can be connected by an imaginary line segment which does not intersect the wall of either pipeline section, and which pipeline ends lie in intersecting planes, comprising the steps of:

placing a first indexing mark at a location on the circumference of each pipeline section end;

placing a corresponding second indexing point on the circumference of each end of the spool, which second indexing points will align with the first indexing points when the spool is joined to the pipeline section ends;

affixing first guides to each end of the spool, said guides defining planar guide surfaces extending beyond the perimeter of the spool;

measuring the angular displacement between said second indexing point and the center of said guide surfaces;

affixing second guides, having planar guide surfaces parallel to the first guides on the corresponding end of the spool, to the underwater pipeline section ends;

orienting said guides on said underwater pipeline ends with the center of such guides being angularly displaced equally from the first indexing point as were the guides on the ends of the spool from the second indexing point;

suspending the spool proximate the pipeline sections to engage the guides on said pipeline section ends with the guides on the spool; and moving said spool into position between said pipeline sections with said guides engaged.

20. The method of claim 19 wherein said guides maintain a small clearance between the face of each pipeline section end and the corresponding end of the spool when said spool is in mating position between the pipeline section ends.

21. The method of claim 19 including the steps of:

affixing said second guides to dummy flanges having a configuration similar to the configuration of the pipeline ends;

orienting the second guides on said dummy flanges to engage the first guides on the end of the spool;

adjusting the orientation of the dummy flanges relative to the guides to permit connection of the dummy flange to the spool;

connecting said dummy flanges to the ends of the spool with said guides engaged;

removing said second guides from said dummy flanges and removing the dummy flanges from the spool;

affixing said second guides on the underwater pipeline ends in the same position relative to the first indexing point on the pipeline end as said guides occupied relative to the second indexing point on the spool when said dummy flange with said second guides was affixed to the spool.

22. The method of claim 19 wherein:

said first guides are affixed to each end of said spool to define planar guide surfaces parallel to the faces of the spool and extending in a direction parallel to the line of intersection of the plane of the faces of the spool.

23. The method of claim 19 wherein:

said first guides are affixed to each end of the spool to define two parallel planar guide surfaces which form angles the sum of which is equal to the angle formed by the intersection of the planes of the ends of the spool, said guides being centered over the point on the perimeter of the ends of the spool determined by lines through the centers of the spool and perpendicular to the line of intersection of the planes of the spool.

24. Apparatus for aligning the ends of subsea pipe sections for mating engagement which comprises:

a removable collar for placement on the end of each pipe section, said collars having a surface lying co-planar with the face of the respective pipe section and being rotatable about the end of the pipe section;

a guide mounted on each of said collars comprising a member that extends beyond the perimeter of the respective pipe section ends for defining a planar guide surface, said guides fitting together to align the ends for mating engagement; and fastening means to lock said collar in fixed position relative to said pipe section end.

25. The apparatus of claim 24 wherein said guide is removably secured to said collar.

* * * * *